United States Patent
Stefanovski et al.

(10) Patent No.: US 8,629,767 B2
(45) Date of Patent: Jan. 14, 2014

(54) SYSTEM FOR PROVIDING A MOBILE ELECTRONIC DEVICE REMINDER

(75) Inventors: James A. Stefanovski, Sterling Heights, MI (US); Matthew M. Highstrom, South Lyon, MI (US); Cody R. Hansen, Shelby Township, MI (US); Andrew W. Gellatly, Macomb, MI (US); Timothy J. Grost, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 205 days.

(21) Appl. No.: 13/331,733

(22) Filed: Dec. 20, 2011

(65) Prior Publication Data

US 2013/0154819 A1 Jun. 20, 2013

(51) Int. Cl.
*B60Q 1/00* (2006.01)

(52) U.S. Cl.
USPC .............. 340/457; 340/425.5; 340/686.1; 340/686.6

(58) Field of Classification Search
USPC .............. 340/457, 425.5, 438, 426.3, 426.22, 340/426.23, 686.1, 686.6; 455/404.1, 899
See application file for complete search history.

(56) References Cited

U.S. PATENT DOCUMENTS 8,284,041 B2 * 10/2012 Cuddihy et al. .............. 340/457
2002/0074786 A1 * 6/2002 Hamperl et al. .............. 280/735

\* cited by examiner

*Primary Examiner* — Toan N Pham
(74) *Attorney, Agent, or Firm* — Cantor Colburn LLP

(57) ABSTRACT

A vehicle system for providing a reminder that at least one mobile electronic device is being left in an interior cabin of a vehicle after a vehicle access event is provided. The vehicle system includes at least one indicator, a vehicle access system, and a control module. The indicator provides notification that the at least one mobile electronic device is being left in the interior cabin of the vehicle after the vehicle access event. The vehicle access system determines a vehicle access event. The control module is in communication with the at least one indicator and the vehicle access system. The control module includes a control logic for establishing a connection between the at least one mobile electronic device and the control module.

20 Claims, 3 Drawing Sheets

SYSTEM FOR PROVIDING A MOBILE ELECTRONIC DEVICE REMINDER

FIELD OF THE INVENTION

Exemplary embodiments of the invention relate to a vehicle system for providing a reminder and, more particularly, to a vehicle system providing a reminder regarding of at least one mobile electronic device.

BACKGROUND

Many individuals own mobile electronic devices such as, for example, smartphones. Mobile electronic devices typically include features such as voice call or text messaging capability. Mobile electronic devices may also be used as an Internet browser or as a media player. As a result, many individuals feel the need to carry their mobile electronic devices with them almost everywhere they travel. For example, some individuals carry their mobile electronic devices with them at all times of the day in an effort to interact with their business clients.

One problem that may occur is that sometimes individuals may inadvertently forget to bring their mobile electronic device with them when leaving their home or their office building. Also, some individuals may accidently leave their mobile electronic device in their vehicle as well. This may result in an individual missing an important telephone call or email message. Accordingly, it is desirable to provide a cost-effective approach for reminding individuals if they have forgotten their mobile electronic device.

SUMMARY OF THE INVENTION

In one exemplary embodiment of the invention, a vehicle system for providing a reminder that at least one mobile electronic device is being left in an interior cabin of a vehicle after a vehicle access event is provided. The vehicle system includes at least one indicator, a vehicle access system, and a control module. The indicator provides notification that the at least one mobile electronic device is being left in the interior cabin of the vehicle after the vehicle access event. The vehicle access system determines a vehicle access event. The control module is in communication with the at least one indicator and the vehicle access system. The control module includes a control logic for establishing a connection between the at least one mobile electronic device and the control module. The control module includes control logic for monitoring the vehicle access system for a data signal indicating the vehicle access event has occurred. The control module includes control logic for determining if the connection between the at least one mobile electronic device and the control module still exists after the control module receives the data signal indicating the vehicle access event has occurred. The control module includes control logic for activating the at least one indicator to provide notification that the at least one mobile electronic device is being left in the interior cabin of the vehicle after the vehicle access event if the connection between the at least one mobile electronic device and the control module still exists.

In another exemplary embodiment of the invention, a vehicle system for providing a reminder that a specific mobile electronic device is not in an interior cabin of a vehicle that is activated and in a condition to receive input regarding operation is provided. The specific mobile electronic device is generally located within the interior cabin of the vehicle after the vehicle is activated. The vehicle system includes at least one indicator, a vehicle access system, a vehicle activation system, and a control module. The at least one indicator for providing notification that the at least one mobile electronic device is not located in the interior cabin of the vehicle after the vehicle is activated. The vehicle access system determines a vehicle entrance event. The vehicle activation system indicates that the vehicle is activated and in a condition to receive input regarding operation. The control module is in communication with the at least one indicator, the vehicle access system, and the vehicle activation system. The control module includes control logic for monitoring the vehicle access system for a data signal indicating the vehicle entrance event has occurred. The control module includes control logic for monitoring the vehicle activation system to determine if the vehicle is activated and in a condition to receive input regarding operation. The control module includes control logic for attempting to establish a connection between the specific mobile electronic device and the control module. The control module includes control logic for determining if the control module is unable to connect with the specific mobile electronic device. The control module includes control logic for activating the at least one indicator to provide notification that the specific mobile device is not in the interior cabin of the vehicle. The at least one indicator is activated if the control module is unable to connect with the specific mobile electronic device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
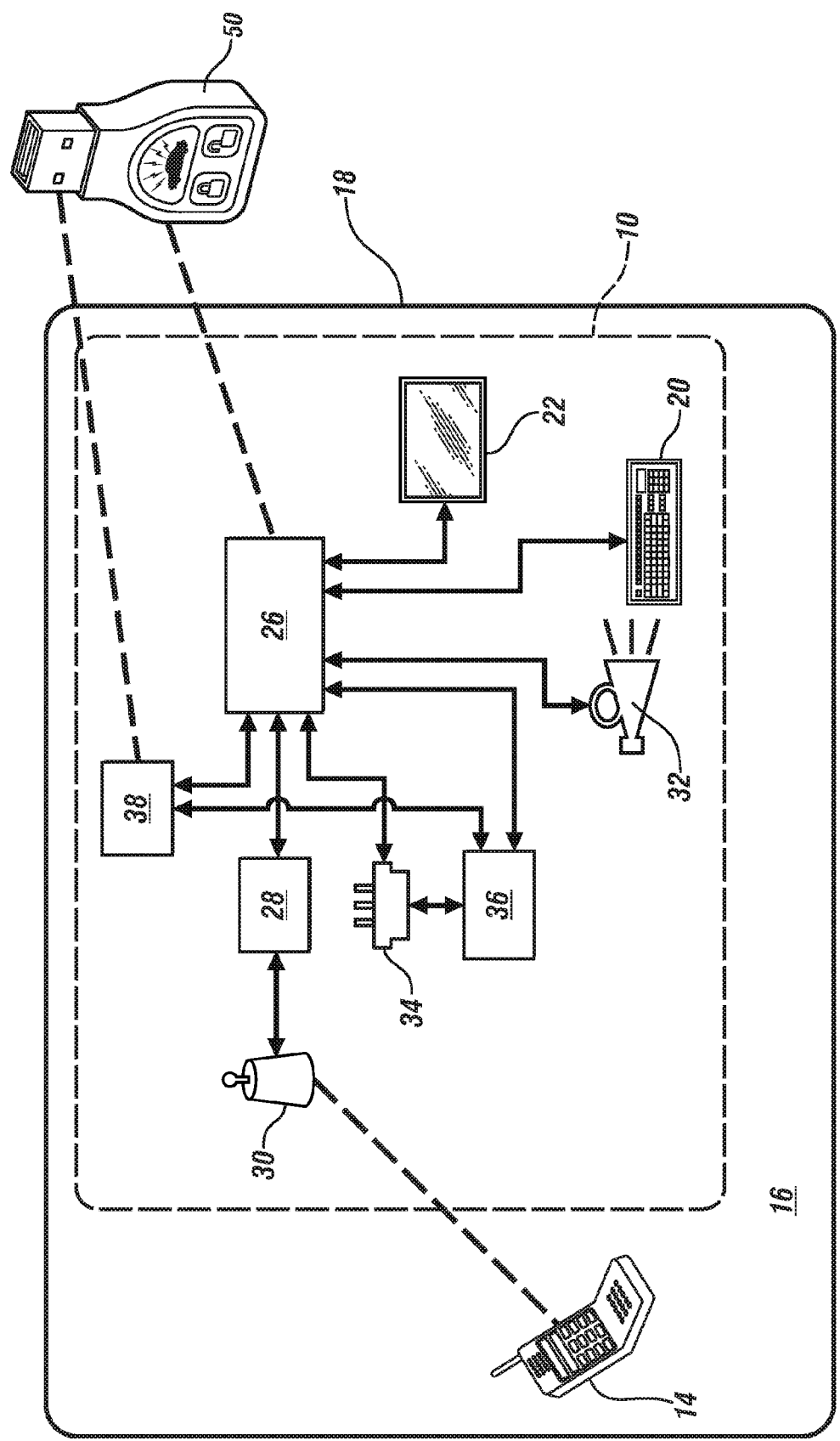
FIG. 1 is a schematic diagram of an exemplary system in a vehicle for providing a reminder regarding a mobile electronic device.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a vehicle system 10 for providing a reminder regarding at least one mobile electronic device 14 that is selectively located within an interior cabin 16 of a vehicle 18. The vehicle system 10 includes a user input 20, a display 22, a control module 26, a transceiver 28, an antenna 30, a horn 32, an ignition switch 34, a retained accessory power ("RAP") module 36, and at least one vehicle access system 38 for determining a vehicle access event. In one embodiment, the control module 26 is in communication with the mobile electronic device 14 through the transceiver 28 and the antenna 30 by a short-range wireless connection. The short-range wireless connection is typically any type of wireless signal for exchanging data over relatively short distances such as, for example, a Bluetooth® signal conforming to IEEE Standard 802.15 or a Wi-Fi® signal conforming to IEEE standard 802.11. Alternatively, in another embodiment the control module 26 may be in communication with the mobile electronic device 14 through a wired or data link connection as well. Some other examples of the short-range wireless connection include, for example, radio frequency identification ("RFID"), wireless infrared communication, dedicated short-range communication ("DSRC"), a physical switch sensor, or a wireless charging sensor as well.

The mobile electronic device 14 is typically any type of portable electronic device associated with or having a recognizable code. For example, the mobile electronic device 14 may be a smartphone or a personal media player. In one embodiment, the recognizable code may be the device address of the mobile electronic device 14. For example, if Bluetooth® is utilized as the connection between the mobile electronic device 14 and the control module 26, then the recognizable code is the Bluetooth® device address.

The user input 20 typically includes a keypad or a keyboard for allowing a user to input information. In one embodiment, the display 22 is a liquid crystal display ("LCD") screen, and is used to display graphics and text. In one example, the user input 20 and the display 22 are a combined unit, where the display is a touchscreen that detects the presence and location of a user's touch. The control module 26 is in communication with the user input 20, the display 22, the transceiver 28, the antenna 30, the horn 32, the ignition switch 34, the RAP module 36, and the vehicle access system 38. Although FIG. 1 illustrates the transceiver 28 and the antenna 30 as separate components from the control module 26, it is to be understood that the transceiver 28 and the antenna 30 may also be integrated with the control module 26 as well.

The ignition switch 34 is typically used for connecting a source of power (not shown in FIG. 1) to a propulsion system (not shown in FIG. 1) as well as power that is supplied to one or more control modules of the vehicle 18. For example, the ignition switch 34 may connect a source of power to the control module 26 and the RAP module 36. The ignition switch 34 includes a key-on state and a key-off state. In the key-on state, electrical power is supplied to the propulsion system. In the key-off state, electrical power is not supplied to the propulsion system. It should be noted that while the terms key-on and key-off are used, a key may not be employed with the ignition switch 34 in some embodiments. For example, in one embodiment the ignition switch 34 may be activated by proximity to a fob 50 that is carried by a user instead of a key. Thus, the key-off state exists when power is supplied to the propulsion system and the key-off state exists when power is not supplied to the propulsion system, regardless of whether an actual key is employed.

The vehicle access system 38 is any type of vehicle system or systems for determining if a vehicle access event has occurred. The vehicle access event may be a driver or passenger of the vehicle 18 either entering or exiting the vehicle 18. The vehicle access system 38 typically determines if either a driver, a passenger, or either a driver or passenger has entered or exited the interior cabin 16 of the vehicle 18. For example, in one embodiment the vehicle access system 38 may include a door sensor (not shown in FIG. 1) for determining if a door (not shown in FIG. 1) of the vehicle 18 has been opened or closed. In yet another embodiment, the vehicle access system 38 may include a seat sensor (not shown in FIG. 1) for determining if a driver or a passenger of the vehicle 18 has arisen from a seat (not shown in FIG. 1) located within the vehicle 18. In another alternative embodiment, the vehicle access system 38 may include a remote door lock module that is part of a keyless entry system. The remote door lock module includes control logic for determining if the doors (not shown) of the vehicle 18 have been locked remotely by a portable unit such as, for example, the fob device 50. In another embodiment, the remote door lock module includes control logic for determining if the doors of the vehicle 18 have been locked remotely by an embedded control module in the vehicle 18 such as, for example, a telematics or a navigational control module (not shown).

The RAP module 36 is in communication with the control module 26, the ignition switch 34 and the vehicle access system 38. The ignition switch 34 typically indicates if the vehicle 18 is in the key-off state, and the vehicle access system 38 may indicate if a door (not shown) of the vehicle 18 has been opened. The RAP module 36 typically allows for the horn 32 and other selected vehicle accessories to operate for a specific length of time after the ignition switch 34 has been placed in the key-off state, or until a door of the vehicle 18 has been opened. In one exemplary embodiment, the specific length of time is between about ten to about fifteen minutes, however it is understood that other increments of time may be used as well. The RAP module 36 typically includes control logic for determining whether retained accessory power in the vehicle 18 is made available to a number of vehicle systems or accessories (not shown) after the ignition switch 34 has been placed in the key-off state. For example, the RAP module 36 could selectively provide power to a radio control module (not shown) for providing power to a radio (not shown) for the specific length of time, or until a door of the vehicle 18 has been opened.

In one exemplary embodiment of the vehicle system 10, the control module 26 is employed to determine if the mobile electronic device 14 has been left within the interior cabin 16 of the vehicle 18 after the vehicle 18 is in the key-off state, and after a driver or passenger of the vehicle 18 exits the vehicle 18. Specifically, the control module includes control logic for activating at least one indicator to provide notification to a driver or passenger of the vehicle 18 that the mobile electronic device 14 is being left in the interior cabin 16 of the vehicle 18. In the embodiment as illustrated in FIG. 1, the at least one indicator is either the display 22 or the horn 32, however it is understood that other indicators may be used as well. For example, in another embodiment the at least one indicator may be an audio system (not shown). The control module 26 includes control logic for sending a graphic signal to the display 22 indicating that the mobile electronic device 14 is left within the interior cabin 16 of the vehicle 18. In another embodiment, the control module 26 includes control logic for sending an audio signal to the horn 32 for indicating that the mobile electronic device 14 is forgotten within the interior cabin 16 of the vehicle 18. For example, the horn 32 may emit a distinct tone or a voice signal indicating "your telephone is still in the vehicle". In yet another embodiment, in the event the at least one indicator is the vehicle horn 32, the control module 26 may include control logic for sending a signal to the horn 32 instructing the horn 32 to emit a short horn tone. In yet another embodiment, the interior cabin 16 of the vehicle 18 includes a compartment (not shown) configured for containing and enclosing the electronic device 14. The at least one indicator involves activating an actuator for a lid or door of the compartment (not shown), where the lid or door is opened to reveal the electronic device 14.

Alternatively, in another embodiment of the vehicle system 10, the control module 26 is employed to determine if a mobile electronic device 14 that is usually located within the interior cabin 16 has been forgotten by a user. Specifically, the mobile electronic device 14 is typically located within the interior cabin of the vehicle 18 after the vehicle 18 is activated and in a condition to receive input regarding operation. Activation of the vehicle 18 typically means that the vehicle 18 may be manipulated by a driver. Vehicle activation may include, for example, the key-on state. In another embodiment, vehicle activation may include a plurality of driver intent sensors (not shown in FIG. 1) that indicate that a shift lever (also not shown in FIG. 1) of the vehicle 18 is in a position other than "P". Thus, in the event a user inadvertently leaves his or her mobile electronic device 14 in his or her house instead of bringing the mobile electronic device 14 to the interior cabin 16 of the vehicle 18, the vehicle system 10 is configured for providing a reminder. That is, the control module 26 includes control logic for activating at least one indicator to notify a driver that a particular mobile electronic device is not located within the interior cabin 16 of the vehicle 18 after the vehicle has been activated, and has likely been forgotten.

Continuing to refer to FIG. 1, the control module 26 includes control logic for establishing a connection with the mobile electronic device 14, where the connection may be a wireless connection, or a data link. In the event a wireless connection is employed, the control module 26 may include control logic for determining the signal strength of the wireless connection. For example, in one embodiment a short-range wireless connection such as a Bluetooth® signal may be used, where the control module 26 includes control logic for detecting the short-range wireless signal, and determining the short-range wireless signal strength between the antenna 30 and the mobile electronic device 14. For example, in one embodiment, the control module 26 may include a Received Signal Strength Indicator ("RSSI") circuit that indicates the strength of the incoming short-range wireless signal, however it is understood that other approaches may be used as well to measure the strength of the short-range wireless signal.

The control module 26 includes control logic for determining if the connection still exists between the mobile electronic device 14 and the control module 26 after the control module 26 receives the data signal indicating the vehicle access event has occurred. As the mobile electronic device 14 is moved away from the interior cabin 16 of the vehicle 18, the strength of the short-range wireless signal will gradually decrease. Thus, in the event a short-range wireless communication exists between the mobile electronic device 14 and the control module 26, the control module 26 includes control logic for comparing the short-range wireless signal strength between the antenna 30 and the mobile electronic device 14 detected before the vehicle access event with the short-range wireless signal strength detected after the vehicle access event. If the difference between the short-range wireless signal strength before and after the vehicle access event exceeds a specified delta, then this is an indication that the short-range wireless connection between the mobile electronic device 14 and the control module 26 no longer exists. In the event that a data link or a cable connection is used to connect the mobile electronic device 14, then the control module 26 may include connection detection circuitry (not shown) to detect the presence or absence of a data link or cable connection.

The memory of the control module 26 includes a database 60 (shown in FIGS. 2-3) that stores at least one recognizable code of a mobile electronic device. Specifically, the database 60 stores the recognizable code of at least one mobile electronic device that has previously established short-range wireless communication or a wired connection with the control module 26. For example, if the short-range wireless connection is a Bluetooth® connection, then the control module 26 and the mobile electronic device have been paired together in the past. The control module 26 also includes control logic for determining if the recognizable codes stored in the database 60 matches the recognizable code of the mobile electronic device 14 that is currently in communication with the control module 26.

The control module 26 may also include control logic for determining the identity of the driver of the vehicle 18. In one embodiment the control module 26 may be able to determine the identity of the driver by the specific fob 50 that is used for key-on of the vehicle 18. For example, in one illustrative embodiment, the fob 50 may be associated with a driver named John Doe. As John Doe uses the fob 50 to either unlock the vehicle 18 or perform a key-on event, the control module 26 includes control logic for determining that John Doe is the driver currently operating vehicle 18. In an alternative approach, the control module 26 includes control logic for determining the identity of the driver based on a mobile electronic device 14 or combination of multiple electronic devices that is in communication with the control module 26. In yet another approach, a driver may use the user input 20 to select an established driver profile that is saved in the memory of the control module 26.

The control module 26 may also include an internal clock for determining the time of day and the day of the week. Specifically, for example, the control module 26 may include a real-time-clock that is typically an integrated circuit that keeps track of the current time and includes a crystal oscillator, however it is to be understood that other approaches may be used as well for determining the time of day and the day of the week. The control module 26 may also include control logic for determining the geographical position of the vehicle 18. For example, in one embodiment, the control module 26 may be in communication with a navigational satellite (not shown in FIG. 1). In one embodiment, the navigational satellite may be a global positioning system ("GPS") satellite, however it is understood that the navigational satellite may be any type of device for sending a signal that indicates the current geographical position of the vehicle 18. The control module 26 may include control logic for receiving the signal from the navigational satellite and evaluates the signal to determine the current location of the vehicle based on the signal received from the navigational satellite. In addition, a last known location of the vehicle 18 may be utilized by the control module 26 in the case that a signal from the navigational satellite is unavailable. The control module 26 may also include control logic for determining at least one point of interest ("POI") that is within a specified distance of the vehicle 18. A POI is typically any type of location that may be visited by a driver or passengers of the vehicle 18 such as, for example, a gas station, a hotel, a restaurant, a shopping mall, or a historical location. In one embodiment, the control module 26 includes a map database that represents a road network including features such as various POIs, and buildings.

The database 60 may further include information regarding the usage patterns of any mobile electronic device 14 that has previously been connected to the control module 26. Specifically, the control module 26 may include control logic for calculating usage patterns of each unique mobile electronic device that has been in communication with the control module 26 by a short-range wireless connection or by a wired connection. For example, in one embodiment, the usage patterns of the mobile electronic device 14 may include the frequency or occurrences when a specific mobile electronic device 14 is removed from the interior cabin 16 of the vehicle 18 after key-off of the ignition switch 34. The control module 26 may further include control logic for determining a driver's preferences over time, where a driver's preference may be saved as part of the established driver profile saved in the memory of the control module 26. In one embodiment an established driver profile may include information regarding a specific mobile electronic device 14 that is associated with the driver.

The usage patterns of any specific mobile electronic device 14 may be based on an established driver profile, the time of day, the day of the week, the geographical location of the vehicle 18, a specific type of POI (i.e. a restaurant or an airport), and the proximity of a specific POI to the vehicle 18. Specifically, for example, the usage patterns of the mobile electronic device 14 may indicate if the mobile electronic device 14 is typically removed from the interior cabin 16 of the vehicle 18 during a specified time of day, day of the week, or when the vehicle 18 is located at a specific geographical location. The control module 26 then sends the calculated usage patterns to the database 60.

The control module 26 may also include control logic for determining if a specific mobile electronic device 14 is not typically removed from the interior cabin 16 of the vehicle 18 after a key-off of the ignition switch 34 based on the calculated usage patterns. For example, the control module 26 may determine that a specific mobile electronic device 14 typically remains in the interior cabin 16 of the vehicle 18 after key-off at about 9 am on Monday-Friday. Alternatively, in another embodiment, the control module 26 may determine that a specific mobile electronic device 14 typically remains in the interior cabin 16 of the vehicle 18 after key-off if the vehicle 18 is within a specified distance from a particular POI such as, for example, a movie theatre. In yet another embodiment, instead of determining if the mobile electronic device 14 is removed from the vehicle 18, the control module 26 receives input from the user input 20. The user input indicates that a specific driver or passenger of the vehicle 18 would not like to be reminded in the event a specific mobile electronic device 14 is left within the interior cabin 16 of the vehicle 18 after key-off.

In the event the control module 26 determines that a specific mobile electronic device 14 is not typically removed from the interior cabin 16 of the vehicle 18 during a specific time of day, or if at a specific geographical location, then the control module 26 may include control logic for suppressing the at least one indicator. That is, the at least one indicator will not provide notification that the mobile electronic device 14 is being left in the interior cabin 16 of the vehicle 18. Thus, the at least one indicator will not provide an audio or visual notification that a specific mobile electronic device 14 is being left in the interior cabin 16 of the vehicle 18. Suppressing the at least one indicator from providing an audio or visual indicator may reduce or prevent driver annoyance in some situations where the mobile electronic device 14 is usually kept within the interior cabin 16 after key-off.

Figure 2:
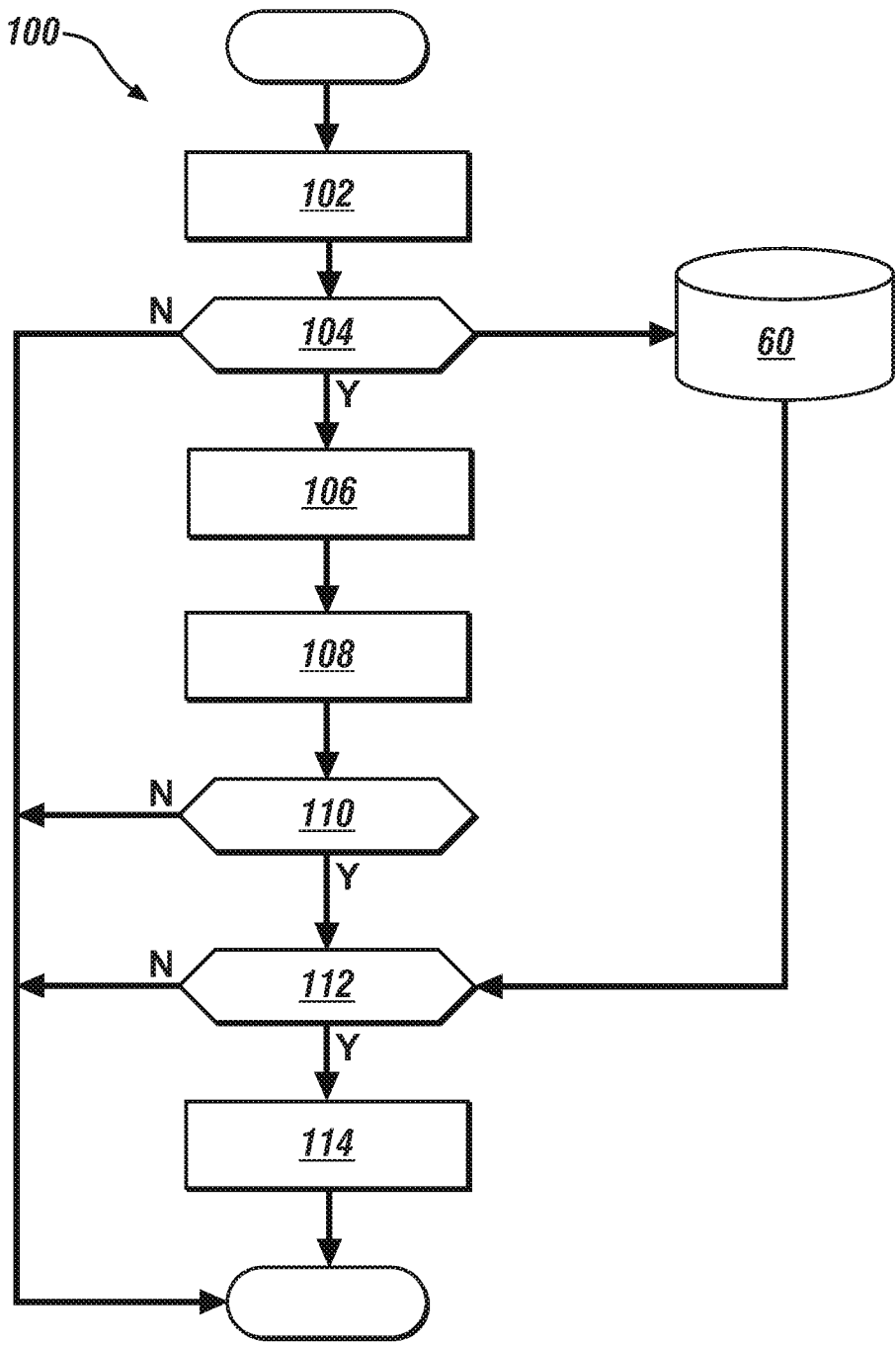
FIG. 2 is a process flow diagram illustrating a method of operating the system shown in FIG. 1.

A method of operating the vehicle system 10 will now be explained. Specifically, FIG. 2 illustrates an exemplary process flow diagram illustrating an exemplary process of operating the vehicle system 10 to provide a reminder in the event a mobile electronic device 14 is forgotten within an interior cabin 16 of the vehicle 18 is generally indicated by reference number 100. Process 100 begins at step 102, where the vehicle 18 is in a key-off state. Specifically, referring to both FIGS. 1-2, a control module 26 includes control logic for monitoring an ignition switch 34 to determine if the vehicle 18 is in the key-off state. It should be noted that step 102 is an optional step, and may be omitted in some embodiments. Process 100 may then proceed to step 104.

In step 104, the control module 26 includes control logic for determining if there is at least one connection established between at least one mobile electronic device 14 and the control module 26. The connection between the mobile electronic device 14 and the control module 26 may be a short-range wireless communication or a wired connection with the control module 26. Process 100 may then proceed to step 106 in the event at least one mobile device 14 is connected with the control module 26. In the event that no connection between the mobile electronic device 14 and the control module 26 is established, then process 100 may then terminate.

In step 106, the control module 26 includes control logic for measuring the strength of the connection between the mobile electronic device 14, or determining if a connection exists between the mobile electronic device 14 and the control module 26. Specifically, in the event a short-range wireless communication exists between the mobile electronic device 24 and the control module 26, the control module 26 includes control logic for determining the short-range wireless signal strength between the antenna 30 and the mobile electronic device 14. Alternatively, if the connection between the mobile electronic device 14 and the control module 26 is a wired connection, the control module 26 determines if a wired connection between the mobile electronic device 14 and the control module 26 exists. For example, the control module 26 may include connection detection circuitry (not shown in FIG. 1) to detect the presence or absence of a data link or cable connection. Process 100 may then proceed to step 108.

In step 108, the control module 26 includes control logic for monitoring a vehicle access system 38 for determining if a vehicle access event has occurred. For example, in one embodiment the vehicle access system 38 may include a door sensor (not shown) for determining if a door (not shown) of the vehicle 18 has been opened or closed. In another alternative embodiment, the vehicle access system 38 may include a remote door lock module that is part of a keyless entry system. The remote door lock module includes control logic for determining if the doors (not shown in FIG. 1) of the vehicle 18 have been locked remotely by a portable unit such as, for example, a fob device 50. The doors of the vehicle 18 may also be unlocked by an embedded unit as well. A vehicle access event may also include if a specific length of time has lapsed. For example, the RAP module 36 is in communication with the control module 26, the ignition switch 34 and the vehicle access system 38. The RAP module 36 sends a signal to the control module 26 indicating that a specific length of time has lapsed. Process 100 may then proceed to step 110.

In step 110, the control module 26 includes control logic for determining if the connection still exists between the mobile electronic device 14 and the control module 26 after the control module 26 receives the data signal indicating the vehicle access event has occurred. Specifically, in the event a short-range wireless communication exists between the mobile electronic device 14 and the control module 26, the control module 26 includes control logic for comparing the short-range wireless signal strength between the antenna 30 and the mobile electronic device 14 that was detected before the vehicle access event and after the vehicle access event. If the difference between the signal strength before and after the vehicle access event exceeds a specified delta, then this is an indication that the short-range wireless connection between the mobile electronic device 14 and the control module 26 no longer exists. Alternatively, if the connection between the mobile electronic device 14 and the control module 26 is a wired connection, the control module 26 determines if a wired connection between the mobile electronic device 14 and the control module 26 still exists after the vehicle access event. If the control module 26 determines that the connection between the mobile electronic device 14 and the control module 26 no longer exists, then process 100 may then terminate. In the event that the control module 26 determines that the connection between the mobile electronic device 14 and the control module 26 still exists, this is an indication that a driver or a passenger of the vehicle 18 may have inadvertently forgotten their mobile electronic device 14 within the interior cabin 16 of the vehicle 18. Process 100 may then proceed to step 112.

In step 112, the control module 26 may include control logic for determining if the mobile electronic device 14 that is forgotten within the interior cabin 16 of the vehicle 18 is a device in need of a reminder. The memory of the control module 26 includes a database 60 for storing at least one recognizable code of a mobile electronic device that has previously established short-range wireless communication or a wired connection with the control module 26. The control module 26 also includes control logic for determining if any of the recognizable codes stored in the database 60 match the recognizable code of the mobile electronic device 14 in communication with the control module 26. The database 60 further includes information regarding the usage patterns of the mobile electronic device 14 within the interior cabin 16 of the vehicle 18. The control module 26 may include control logic for determining if a specific mobile electronic device 14 is not typically removed from the interior cabin 16 of the vehicle 18 after a key-off of the ignition switch 34 during a specific time of day based on the calculated usage patterns.

Alternatively, in yet another embodiment, instead of determining if the mobile electronic device 14 is not typically removed from the vehicle 18, the control module 26 receives input from the user input 20. The input indicates that a specific driver or passenger of the vehicle 18 would not like to be reminded in the event a specific mobile electronic device 14 is left within the interior cabin 16 of the vehicle 18 after key-off. In the event that the control module 26 determines that the mobile electronic device 26 is not in need of a reminder, then process 100 may then terminate. However, if the control module 26 determines that the mobile electronic device 14 that is forgotten within the interior cabin 16 of the vehicle 18 is a device in need of a reminder, Process 100 may then proceed to step 114.

In step 114, the control module 26 includes control logic for activating at least one indicator to provide notification that the at least one mobile electronic device 14 is being left within the interior cabin 16 of the vehicle 18 after key-off. For example, in the embodiment as illustrated in FIG. 1 the at least one indicator is either the display 22 or the horn 32, however it is understood that other indicators may be used as well such as, for example, a vehicle horn. Process 100 may then terminate.

In an alternative embodiment, the usage patterns of the mobile electronic device 14 may include determining if a specific mobile electronic device 14 is usually located within the interior cabin 16 of the vehicle 18 after activation. Vehicle activation may include, for example, the key-on state or if a plurality of driver intent sensors indicate that a shift lever of the vehicle 18 is in a position other than "P". Specifically, the control module 26 may include control logic for activating at least one indicator to indicate if a mobile electronic device 14 that is usually within the interior cabin 16 of the vehicle 18 has been forgotten. An alternative method of operating the vehicle system 10 will now be explained. Specifically, FIG. 3 illustrates a process flow diagram for providing a reminder in the event a mobile electronic device 14 is forgotten is generally indicated by reference number 200.

Figure 3:
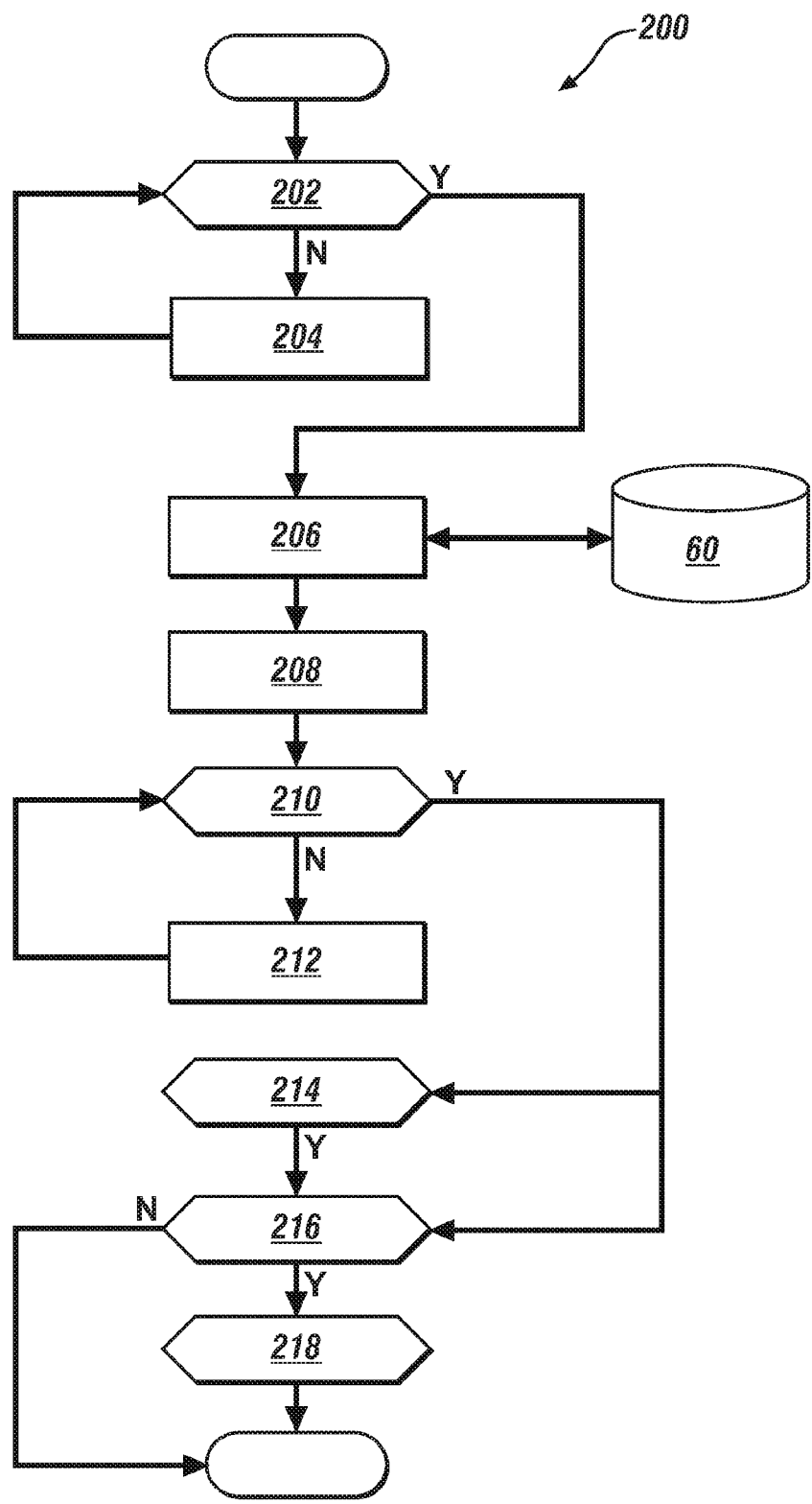
FIG. 3 is a process flow diagram illustrating an alternative embodiment of a method of operating the system shown in FIG. 1.

Referring to FIGS. 1 and 3, process 200 begins at step 202, where the control module 26 includes control logic for determining if a vehicle entrance event has occurred. Referring to FIG. 1, a vehicle access system 38 is provided. The vehicle access system 38 is any type of vehicle system or systems for determining if a driver or passenger of the vehicle 18 has entered the vehicle 18. For example, in one embodiment the vehicle access system 38 may include a door sensor (not shown) for determining if a door (not shown) of the vehicle 18 has been opened or closed. In another alternative embodiment, the vehicle access system 38 may include a remote door lock module that is part of a keyless entry system. The remote door lock module includes control logic for determining if the doors (not shown) of the vehicle 18 have been unlocked remotely by a portable or embedded unit such as, for example, a fob device 50 or a navigational unit. In the event that a vehicle entrance event has not occurred, process 200 may then proceed to step 204, where the control module 26 continues to monitor the vehicle access system 38 until a vehicle entrance event has occurred. In the event that a vehicle entrance event has occurred, process 200 may then proceed to step 206.

In step 206, the control module 26 includes control logic for monitoring a database 60 that stores at least one recognizable code of a mobile electronic device 14. Process 200 may then proceed to step 208.

In step 208, the control module 26 includes control logic for establishing a connection with at least one mobile electronic device 14, where the connection may be a wireless connection or, alternatively, a wired connection. It should be noted that step 208 is an optional step, and that a connection need not be established with a mobile electronic device 14 if no mobile electronic device 14 is available in the interior cabin 16 of the vehicle 18. Process 200 may then proceed to step 210.

In step 210, the control module 26 includes control logic for determining if the vehicle 18 is activated and is in a condition to receive input regarding operation by monitoring at least one vehicle activation system. Specifically, referring to FIG. 1, in one embodiment the control module 26 includes control logic for monitoring an ignition switch 34 to determine if the vehicle 18 is in the key-on state. Alternatively, in another embodiment, the control module 26 is in communication with a plurality of driver intent sensors (not shown in FIG. 1) for determining the position of a shift lever (not shown in FIG. 1). In this example, the control module 26 determines that the vehicle 18 is activated and may be driven unless the driver intent sensors indicate that the shift lever is in "P" (for an automatic transmission) or "N" (for a manual transmission). In the event the vehicle 18 is not activated to be driven, process 200 may then proceed to step 212, where the control module 26 includes control logic for continuing to monitor either the ignition switch 34 or a plurality of driver intent sensors to determine if the vehicle 18 is in a condition to receive input regarding operation.

In the event the vehicle 18 is activated to be driven, process 200 may then proceed to step 214 or to step 216. Specifically, in the event that a connection is established with at least one mobile electronic device 14 as described in step 208, then process 200 may then proceed to step 214. In the event that a connection is not established with at least one mobile electronic device 14, and step 208 is omitted, then process 200 may proceed to step 216.

In step 214, the control module 26 includes control logic for determining if any recognizable codes stored in the database 60 match the recognizable code of the mobile electronic device 14 that is in communication with the control module 26 as established in step 208. Step 214 is an optional step that is performed if communication is established between the control module 26 and at least one mobile electronic device 14 as described in step 208. The control module 26 also includes control logic for adding the recognizable code of the mobile electronic device 14 that is in communication with the control module 26 to the database 60 in the event the recognizable code is not already stored in the database 60. The control module 26 may also include control logic for updating the database 60 to reflect any changes regarding calculated usage patterns of the mobile electronic devices 14 as well. Specifically, the database 60 includes calculated usage patterns of each unique mobile electronic device that has been in communication with the control module 26 by a short-range wireless connection or by a wired connection. The usage patterns may include information indicating if a specific mobile electronic device 14 is typically located in the interior cabin 16 after the vehicle 18 is activated. Process 200 may then proceed to step 216.

In step 216, the control module 26 includes control logic for searching the database 60 to determine if a specific mobile electronic device 14 that is usually located within the interior cabin 16 after the vehicle 18 is activated and in a condition to receive input regarding operation is not currently in communication with the control module 26. In the event there are mobile electronic devices 14 that are not currently in communication with the control module 26, but should be based on the usage patterns stored in the database 60, then process 200 may proceed to step 218. However, in the event that the usage patterns indicate that there are no missing mobile electronic devices 14 that are typically located in the interior cabin 16, process 200 may then terminate.

In step 218, the control module 26 includes control logic for activating at least one indicator to provide notification that the at least one mobile electronic device 14 is not within the interior cabin 16 of the vehicle 18. For example, in the embodiment as illustrated in FIG. 1 the at least one indicator is either the display 22 or the horn 32, however it is understood that other indicators may be used as well. It should be noted that step 218 may be omitted in the event that a user indicates that a reminder is not needed. For example, in one embodiment, a user may indicate that he or she does not need a notification that a mobile electronic device 14 is not located within the interior cabin 16 by entering input by the user input 20. Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle system for providing a reminder that at least one mobile electronic device is being left in an interior cabin of a vehicle after a vehicle access event, the vehicle system comprising:
    at least one indicator for providing notification that the at least one mobile electronic device is being left in the interior cabin of the vehicle after the vehicle access event;
    a vehicle access system for determining the vehicle access event;
    and
    a control module in communication with the at least one indicator and the vehicle access system, the control module comprising:
        a control logic for establishing a connection between the at least one mobile electronic device and the control module;
        a control logic for monitoring the vehicle access system for a data signal indicating the vehicle access event has occurred;
        a control logic for determining if the connection between the at least one mobile electronic device and the control module still exists after the control module receives the data signal indicating the vehicle access event has occurred; and
        a control logic for activating the at least one indicator to provide notification that the at least one mobile electronic device is being left in the interior cabin of the vehicle after the vehicle access event if the connection between the at least one mobile electronic device and the control module still exists.

2. The vehicle system as recited in claim 1, comprising an ignition switch producing a key-off event, wherein the control module includes control logic for monitoring the ignition switch to determine if the key-off event has occurred.

3. The vehicle system as recited in claim 2, wherein the control module includes control logic for activating the at least one indicator if the key-off event has occurred and if the connection between the at least one mobile electronic device and the control module still exists.

4. The vehicle system as recited in claim 1, wherein the connection between the at least one mobile electronic device and the control module is one of a short-range wireless connection and a wired connection.

5. The vehicle system as recited in claim 4, wherein the communication between the at least one mobile electronic device and the control module is the wireless connection, and wherein the control module includes control logic for monitoring the short-range wireless data connection and determining a change in signal strength of the short-range wireless data connection.

6. The vehicle system as recited in claim 1, wherein the vehicle access system includes one of a door sensor and a remote locking control module.

7. The vehicle system as recited in claim 6, wherein the vehicle access system is in communication with a retained accessory power module for providing retained accessory power for a specific length of time, and wherein the vehicle access event includes a determination that the specific length of time has lapsed.

8. The vehicle system as recited in claim 1, wherein a recognizable code is associated with the at least one mobile electronic device, and wherein a memory of the control module includes a database having at least one recognizable code of at least one connected mobile electronic device that has previously been connected to the control module stored thereon.

9. The vehicle system as recited in claim 8, wherein the control module includes a control logic for determining if the at least one recognizable code stored in the database is identical to the recognizable code associated with the mobile electronic device.

10. The vehicle system as recited in claim 9, wherein the database includes a plurality of recognizable codes, and wherein a portion of the plurality of recognizable codes are selected as a device in need of a reminder.

11. The vehicle system as recited in claim 10, wherein the control module includes control logic for activating the at least one indicator if the at least one mobile electronic device being left in the interior cabin of the vehicle after the key-off event is the device in need of a reminder.

12. The vehicle system as recited in claim 1, wherein a memory of the control module includes a database, and wherein the database includes a usage pattern of at least one connected mobile electronic device that has previously been connected to the control module, and wherein the usage pattern of the at least one connected mobile electronic device is based on at least one of an established driver profile, a time of day, a day of the week, a geographical location of the vehicle, a specific type of POI, and a proximity of a specific POI to the vehicle.

13. The vehicle system as recited in claim 1, wherein the at least one indicator is at least one of a display, an audio system, a vehicle compartment, and a vehicle horn.

14. A vehicle system for providing a reminder that a specific mobile electronic device is not in an interior cabin of a vehicle that is activated and in a condition to receive input regarding operation, the specific mobile electronic device generally located within the interior cabin of the vehicle after the vehicle is activated, the vehicle system comprising:
at least one indicator for providing notification that the at least one mobile electronic device is not located in the interior cabin of the vehicle after the vehicle is activated;
a vehicle access system for determining a vehicle entrance event;
a vehicle activation system for indicating that the vehicle is activated and in a condition to receive input regarding operation; and
a control module in communication with the at least one indicator, the vehicle access system, and the vehicle activation system, the control module comprising:
a control logic for monitoring the vehicle access system for a data signal indicating the vehicle entrance event has occurred;
a control logic for monitoring the vehicle activation system to determine if the vehicle is activated and in a condition to receive input regarding operation;
a control logic for attempting to establish a connection between the specific mobile electronic device and the control module;
a control logic for determining if the control module is unable to connect with the specific mobile electronic device; and
a control logic for activating the at least one indicator to provide notification that the specific mobile electronic device is not in the interior cabin of the vehicle, wherein the at least one indicator is activated if the control module is unable to connect with the specific mobile electronic device.

15. The vehicle system as recited in claim 14, wherein a memory of the control module includes a database that stores a calculated usage pattern associated with the specific mobile electronic device, and wherein the usage pattern of the specific mobile electronic device is based on at least one of an established driver profile, a time of day, a day of the week, a geographical location of the vehicle, a proximity of a specific POI, and a specific type of POI to the vehicle.

16. The vehicle system as recited in claim 14, wherein the vehicle activation system is one of an ignition switch and a plurality of driver intent sensors for determining a position of a shift lever.

17. The vehicle system as recited in claim 14, wherein the vehicle access system includes one of a door sensor and a remote locking control module.

18. The vehicle system as recited in claim 14, wherein the control module includes a memory having a database that includes a plurality of recognizable codes stored thereon, and wherein a recognizable code is associated with the specified mobile electronic device, and wherein a portion of the plurality of recognizable codes are selected as a device that is in need of a reminder.

19. The vehicle system as recited in claim 18, wherein the control module includes control logic for determining if one of the plurality recognizable codes stored in the database is identical to the recognizable code associated with the specific mobile electronic device if the connection between the specific mobile electronic device and the control module is established.

20. The vehicle system as recited in claim 19, wherein the control module includes a control logic for activating the at least one indicator if the recognizable code of the specific mobile electronic device is the portion of the plurality of recognizable codes that are selected as a device in need of a reminder.

* * * * *